United States Patent
Tsuboi et al.

(10) Patent No.: US 7,800,035 B2
(45) Date of Patent: *Sep. 21, 2010

(54) OPTICAL WAVEFRONT CONTROL PATTERN GENERATING APPARATUS AND OPTICAL WAVEFRONT CONTROL PATTERN GENERATING METHOD

(75) Inventors: Masashi Tsuboi, Yokosuka (JP); Tsutomu Horikoshi, Kamakura (JP)

(73) Assignee: NTT DoCoMo, Inc., Tokyo (JP)

( * ) Notice: Subject to any disclaimer, the term of this patent is extended or adjusted under 35 U.S.C. 154(b) by 448 days.

This patent is subject to a terminal disclaimer.

(21) Appl. No.: 11/587,920

(22) PCT Filed: Apr. 26, 2005

(86) PCT No.: PCT/JP2005/007921

§ 371 (c)(1),
(2), (4) Date: Apr. 25, 2008

(87) PCT Pub. No.: WO2005/103841

PCT Pub. Date: Nov. 3, 2005

(65) Prior Publication Data

US 2009/0097758 A1    Apr. 16, 2009

(30) Foreign Application Priority Data

Apr. 26, 2004  (JP) .............................. 2004-130243
Apr. 11, 2005  (JP) .............................. 2005-113425

(51) Int. Cl.
  *G02B 27/52* (2006.01)
  *G03H 1/00* (2006.01)
  *G06K 9/76* (2006.01)
(52) U.S. Cl. ..................... 250/201.9; 359/9; 382/211
(58) Field of Classification Search .............. 250/201.9; 359/9; 382/310, 311, 210, 211
See application file for complete search history.

(56) References Cited

U.S. PATENT DOCUMENTS 5,617,225 A    4/1997  Aritake et al.
7,113,268 B2 *  9/2006  Gerwe et al. ................. 356/121

(Continued)

FOREIGN PATENT DOCUMENTS

EP    0840159 A2 *  5/1998

(Continued)

OTHER PUBLICATIONS

Yen-Wei Chen, et al., "A Fast Kinoform Optimization Algorithm Based on Simulated Annealing", IEICE Trans. Fundamentals, vol. E83-A, No. 4, pp. 774-776, 2000, Apr. 2000.

(Continued)

*Primary Examiner*—John R Lee
(74) *Attorney, Agent, or Firm*—Oblon, Spivak, McClelland, Maier & Neustadt, L.L.P.

(57) ABSTRACT

An optical wavefront control pattern generating apparatus includes: a reconstructed image detector unit configured to detect a reconstructed image displayed on the reconstructed image display; and an optimizer unit configured to evaluate the reconstructed image detected by the reconstructed image detector unit, and to generate the optimum optical wavefront control pattern by applying a modification process to the optical wavefront control pattern in order for a result of the evaluation to satisfy a predetermined condition.

12 Claims, 5 Drawing Sheets

U.S. PATENT DOCUMENTS

2008/0246849 A1\* 10/2008 Tsuboi et al. ............ 348/218.1
2009/0097758 A1\* 4/2009 Tsuboi et al. ............... 382/210

FOREIGN PATENT DOCUMENTS

| JP | 1 319085 | 12/1989 |
|---|---|---|
| JP | 1-319085 | 12/1989 |
| JP | 10-186283 | 7/1998 |
| JP | 10 186283 | 7/1998 |
| JP | 11 337733 | 12/1999 |
| JP | 2003 263094 | 9/2003 |
| JP | 2004 184609 | 7/2004 |

OTHER PUBLICATIONS

Nobukazu Yoshikawa, et al., "Phase Optimization of a Kinoform by Simulated Annealing", Applied Optics, vol. 33, No. 5, pp. 863-868, 1994, Feb. 1994.

Björn Löfving, "Self-adjusting dynamic binary phase holograms", Applied Optics, vol. 36, No. 11, XP 000690741, Apr. 10, 1997, pp. 2347-2352.

\* cited by examiner

IMAGE RECONSTRUCTION SYSTEM A

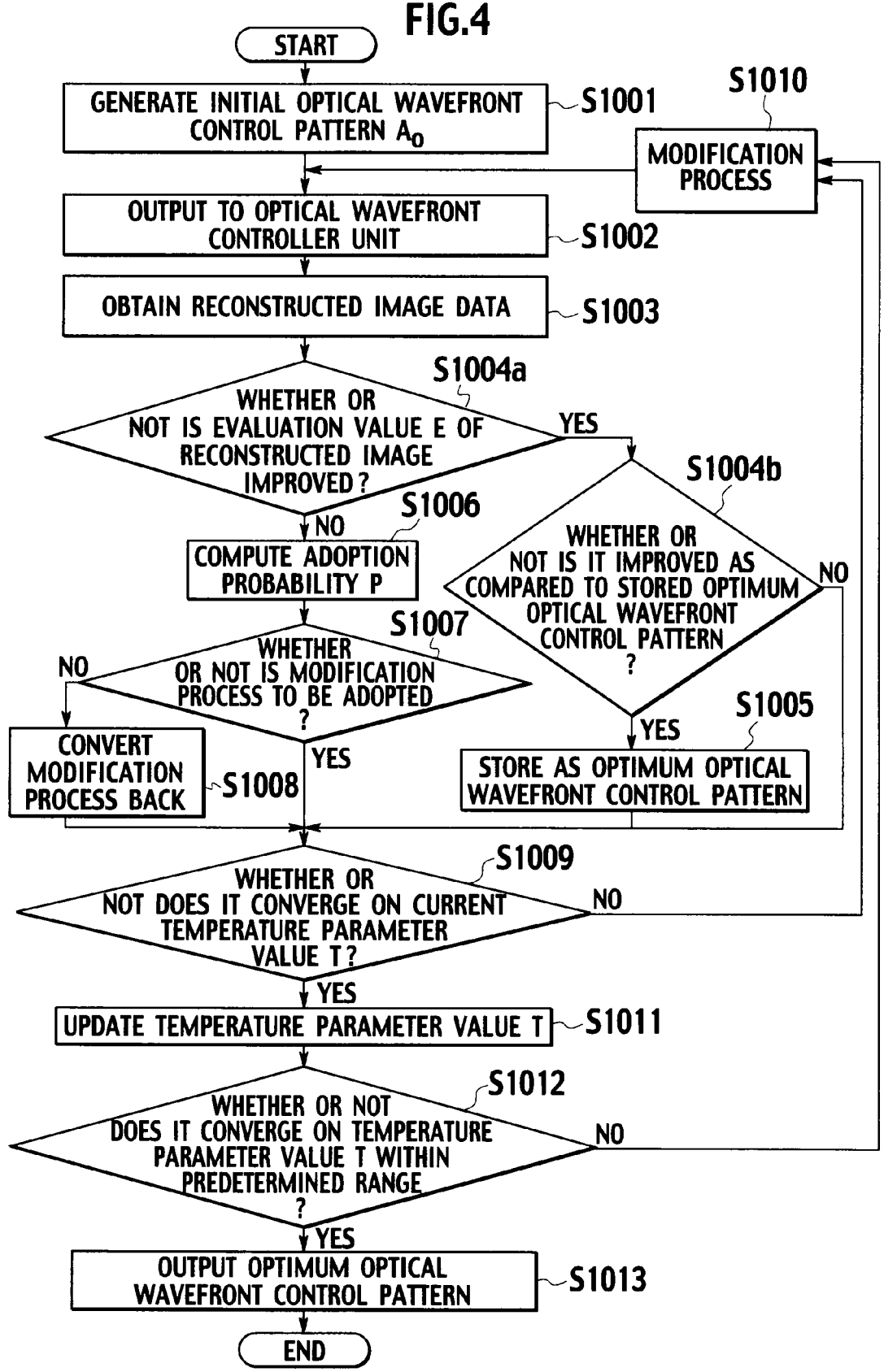

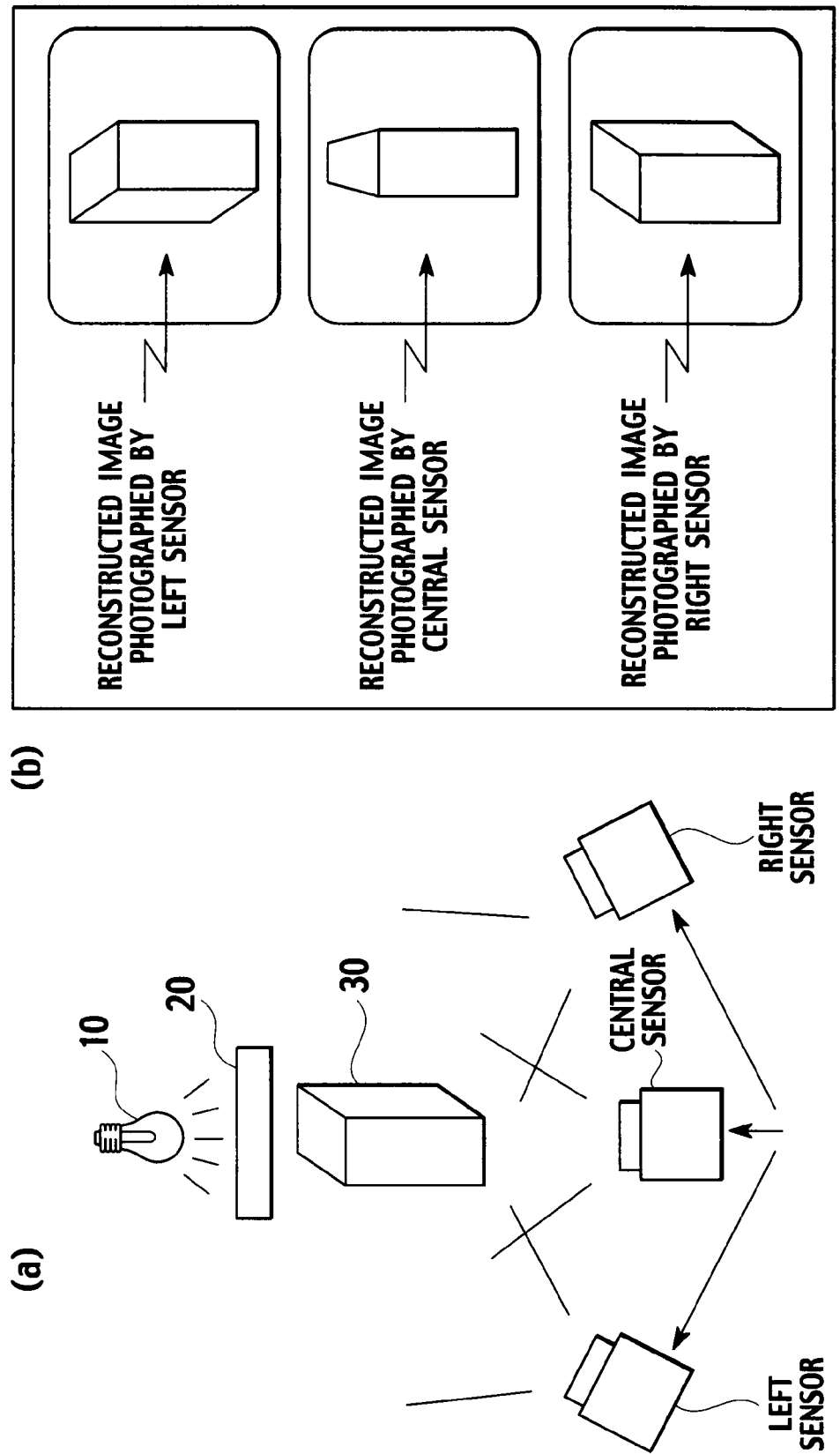

OPTICAL WAVEFRONT CONTROL PATTERN GENERATING APPARATUS AND OPTICAL WAVEFRONT CONTROL PATTERN GENERATING METHOD

TECHNICAL FIELD

The present invention relates to an optical wavefront control pattern generating apparatus and an optical wavefront control pattern generating method which generate an optimum optical wavefront control pattern which is to be stored in an optical wavefront controller unit, in an image reconstruction system displaying a reconstructed image on a reconstructed image display unit, by irradiating the optical wavefront controller unit, in which an optical wavefront control pattern is recorded, with illuminating light.

BACKGROUND ART

Conventionally, "holography" has been known as a technology for displaying a reconstructed image on a reconstructed image display unit, by irradiating an optical wavefront controller unit, in which an optical wavefront control pattern (a hologram) is recorded, with illuminating light.

The "holography" is a technology for reconstructing an optical wavefront itself of an object beam, by controlling at least any one of a phase and an amplitude of the illuminating light by using the optical wavefront control pattern stored in the optical wavefront controller unit.

Additionally, a "simulated annealing" method has been conventionally known as an approximate solution method used for solving a combination optimization problem.

The "simulated annealing" method is a stochastic search technique in which a solution space is searched, and in which an optimum solution is obtained, by repeating an operation (a Move operation) of modifying one solution to another.

In the "simulated annealing" method, in a case where an evaluation value E of a solution is enhanced (that is, in a case where the solution is improved) by a Move operation, this Move operation is adopted, and a solution obtained after the Move operation is set to be a new solution.

On the other hand, in the "simulated annealing" method, in a case where the evaluation value E of the solution is deteriorated (that is, in a case where the solution is worsened) by a Move operation, it is determined whether or not this Move operation is to be adopted (that is, whether or not a solution obtained after the Move operation is to be converted back to the solution prior to the Move operation), on the basis of an adoption probability P ($=\exp(-\Delta E/T)$) which is computed on the bases of a parameter value T termed as a "temperature" (hereinafter referred to as a temperature parameter value T) and of an amount $\Delta E$ of worsening.

Here, in the "simulated annealing" method, the temperature parameter value T is caused to gradually decrease through an algorithm of the "simulated annealing" method from a sufficiently high temperature to a sufficiently low temperature by taking a sufficiently long time period. Thereby, it is made possible to control the probability of adopting a case of a Move operation worsening the solution, and to prevent an optimum solution from being computed locally.

Recently, in the field of holography, techniques using the "simulated annealing" method for optimization particularly of "kinoform" are proposed, among computer generated holograms (CGHs) which are holograms (optical wavefront control patterns) generated through computations by a computer. The amplitude of the kinoform is supposedly constant, and a phase of the kinoform alone is distributed (for example, refer to Non-patent Document 1).

Furthermore, in order to reduce an amount of computation regarding solution evaluation which needs to be performed a large number of times because of the nature of the "simulated annealing" method, there has also been proposed a method of computing a solution obtained after a Move operation on the basis of difference information with a solution prior to the Move operation (for example, refer to Non-patent Document 2).

By using the above method, an amount of computation regarding evaluation of a reconstructed image is reduced to "O(N)", the evaluation having conventionally required an amount of computation to be "O(NlogN)" for an image size N ($=Nx \times Ny$). In addition, the amount of computation which is "O(NlogN)" means an amount of computation which is in the order of NlogN, and the amount of computation which is "O(N)" means an amount of computation which is in the order of N.

Non-Patent Document 1

Nobukazu Yoshizawa and Toyohiko Yatagai, "Phase Optimization of a Kinoform by Simulated Annealing," APPLIED OPTICS Vol. 33 No. 5, pp 863-868, 1994

Non-Patent Document 2

Yen-Wei Chen, Shinichiro Yamauchi, Ning Wang and Zensho Nakao, "A Fast Kinoform Optimization Algorithm Based on Simulated Annealing," IEICE TRANS. FUNDAMENTALS Vol. E83-A No. 4, pp 774-776, April 2000

However, in a method of computing a solution obtained after each of Move operations on the basis of difference information with a solution prior to the Move operation as in the case of conventional Non-patent Document 2, even if an amount of computation for a solution obtained after each of the individual Move operations can be reduced to the linear order, a fundamental problem that an amount of computation increases with increasing size of a hologram cannot be solved.

In holography using conventional computer generated holograms, computations are performed on the supposition that each equipment performs an ideal behavior in a state where no flaws exist in characteristics of an optical wavefront control device which records a hologram, or in arrangement of the equipment. Accordingly, noise is sometimes recognized in a reconstructed image in a case where the characteristics of the optical wavefront control device are different from those expected, or due to such reasons as minute individual variability existing in actual equipment. As a result, there has been a problem that a reconstructed image which is computed through computer simulation, and a reconstructed image which is reconstructed by incorporating a computer generated hologram into an actual image reconstruction system (an optical system) are not necessarily identical to each other.

Particularly, in a case of holography using the kinoform, the premise is that an amplitude of light on a hologram surface is constant. However, it is not necessarily possible to modulate only a phase of light, and the amplitude of light is also modulated more or less. Thereby, a problem with noise in the reconstructed image is more conspicuous.

The above problems occur as a result of approximately obtaining a computer generated hologram under ideal conditions. Hence, it is considered that reduction of noise in the reconstructed image is possible with more precise computation of the computer generated hologram in consideration of more detailed environmental data and data of each equipment actually used.

However, it is very difficult, and unrealistic, to strictly pursue causes of noise in the reconstructed image, the noise occurring in the real world, and to model elements of noises in a way that the elements are manageable on a computer.

DISCLOSURE OF THE INVENTION

Consequently, the present invention has been made in consideration of the above points. An object of the present invention is to provide an optical wavefront control pattern generating apparatus and an optical wavefront control pattern generating method with which the problem with noise, which is practically insoluble with software, can be solved through processing with hardware, and with which a desired reconstructed image can be obtained faster and more accurately.

A first aspect of the present invention is summarized as an optical wavefront control pattern generating apparatus which generates an optimum optical wavefront control pattern which is to be stored in an optical wavefront controller unit, in an image reconstruction system displaying a reconstructed image on a reconstructed image display unit, by irradiating the optical wavefront controller unit, in which an optical wavefront control pattern is recorded, with illuminating light, the apparatus includes: a reconstructed image detector unit configured to detect a reconstructed image displayed on the reconstructed image display unit; and an optimizer unit configured to evaluate the reconstructed image detected by the reconstructed image detector unit, and to generate the optimum optical wavefront control pattern by applying a modification process to the optical wavefront control pattern in order for a result of the evaluation to satisfy a predetermined condition.

In the first aspect of the present invention, the optimizer unit can be configured to generate the optimum optical wavefront control pattern, by repeating an application of a modification process to the optical wavefront control pattern, a computation of an evaluation value of a reconstructed image corresponding to the optical wavefront control pattern to which the modification process has been applied, and a determination, on the basis of the evaluation value, of whether or not the optical wavefront control pattern, to which the modification process has been applied, is to be adopted.

In the first aspect of the present invention, on the basis of difference information on evaluation values of the reconstructed image respectively before and after the modification process, the optimizer unit can be configured to determine whether or not the optical wavefront control pattern, to which the modification process has been applied, is to be adopted.

In the first aspect of the present invention, on the basis of the difference information and of an adoption probability determined by a repetitive parameter value, the optimizer unit can be configured to determine whether or not the optical wavefront control pattern, to which the modification process has been applied, is to be adopted.

In the first aspect of the present invention, the optimizer unit can be configured to repeat the application of the modification process, the computation of the evaluation value, and the determination, until the evaluation values of the reconstructed image converge on a predetermined repetitive parameter value.

In the first aspect of the present invention, the optimizer unit can be configured to vary the predetermined repetitive parameter value within a predetermined range.

In the first aspect of the present invention, the optical wavefront controller unit can include an optical wavefront control device capable of modulating at least any one of an amplitude and a phase of the illuminating light by use of the recorded optical wavefront control pattern.

In the first aspect of the present invention, the reconstructed image detector unit can include a sensor capable of detecting the reconstructed image displayed on the reconstructed image display unit by use of reconstruction light obtained by modulating at least any one of an amplitude and a phase of the illuminating light.

In the first aspect of the present invention, the optimizer unit can be configured to evaluate the reconstructed image on the basis of the reconstructed image detected by the sensor.

In the first aspect of the present invention, the reconstructed image detector unit can include a plurality of sensors each capable of detecting the reconstructed image displayed on the reconstructed image display unit by use of reconstruction light obtained by modulating at least any one of an amplitude and a phase of the illuminating light, and the optimizer unit can be configured to evaluate the reconstructed image on the bases of a plurality of reconstructed images respectively detected by the plurality of sensors.

A first aspect of the present invention is summarized, as optical wavefront control pattern generating method for generating an optimum optical wavefront control pattern which is to be stored in an optical wavefront controller unit, in an image reconstruction system displaying a reconstructed image on a reconstructed image display unit, by irradiating the optical wavefront controller unit, in which an optical wavefront control pattern is recorded, with illuminating light, the method includes: detecting the reconstructed image detected by the detecting; and generating the optimum optical wavefront control pattern by applying a modification process to the optical wavefront control pattern in order for a result of the evaluation to satisfy a predetermined condition.

BRIEF DESCRIPTION OF THE DRAWINGS

FIG. 4 is a flowchart showing operations of the optical wavefront control pattern generating apparatus according to the first embodiment of the present invention.

FIGS. 5(a) and 5(b) are diagrams for explaining an optical wavefront control pattern generating apparatus according to a second embodiment of the present invention.

BEST MODE FOR CARRYING OUT THE INVENTION

Figure 1:
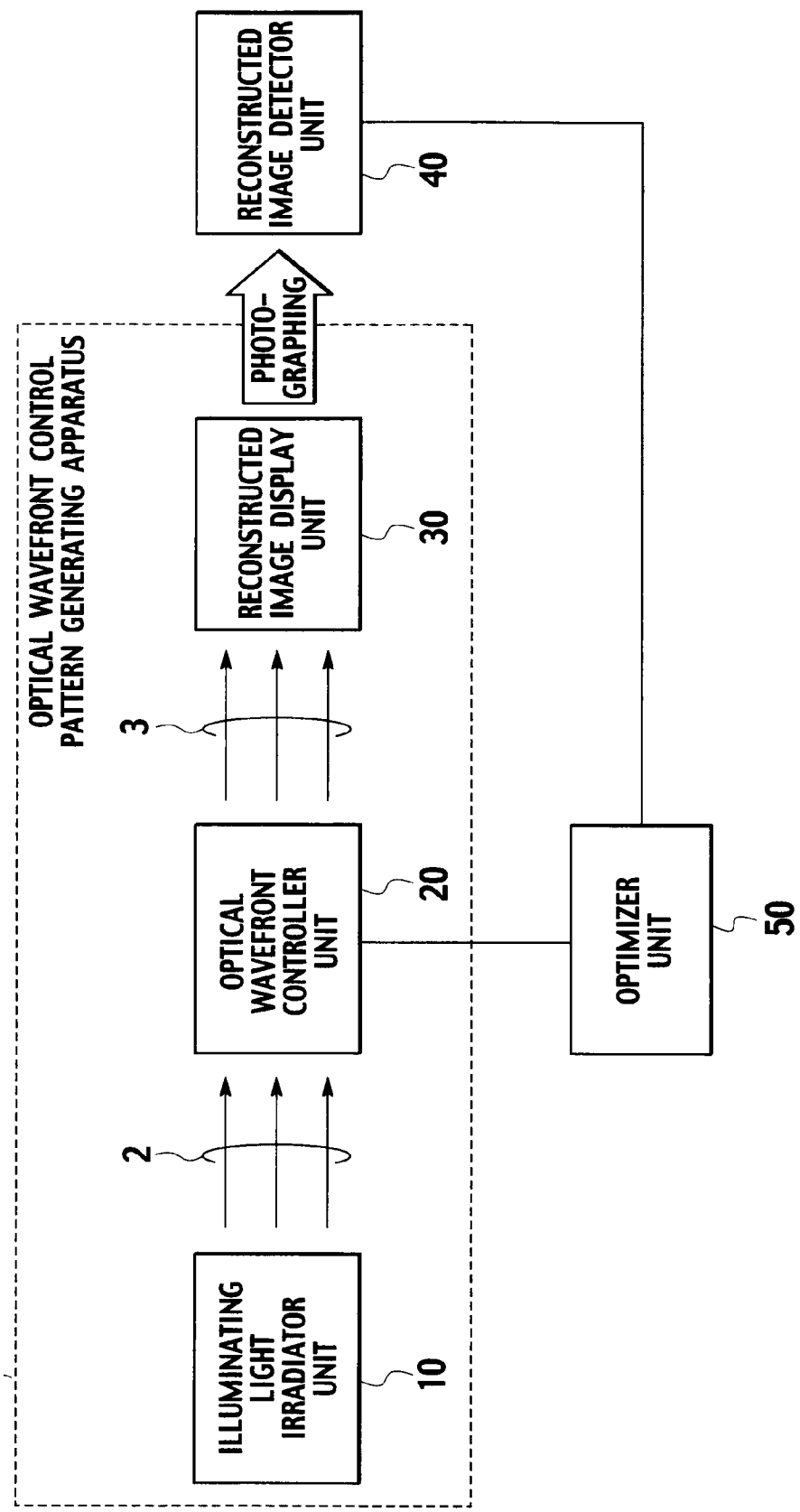
FIG. 1 is a functional block diagram of an optical wavefront control pattern generating apparatus according to a first embodiment of the present invention.
Figure 2:
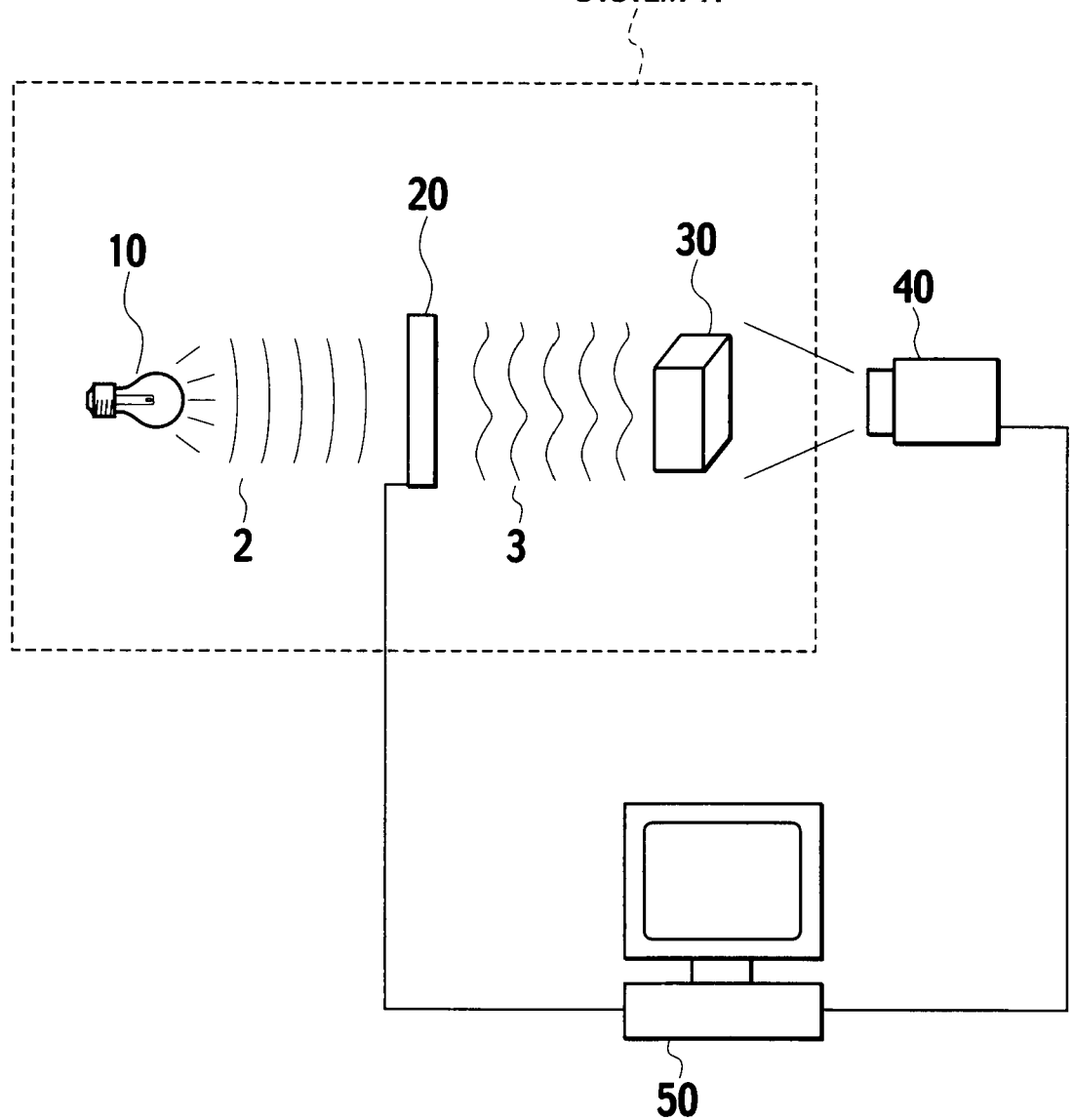
FIG. 2 is a model diagram of the optical wavefront control pattern generating apparatus according to the first embodiment of the present invention.
Figure 3:
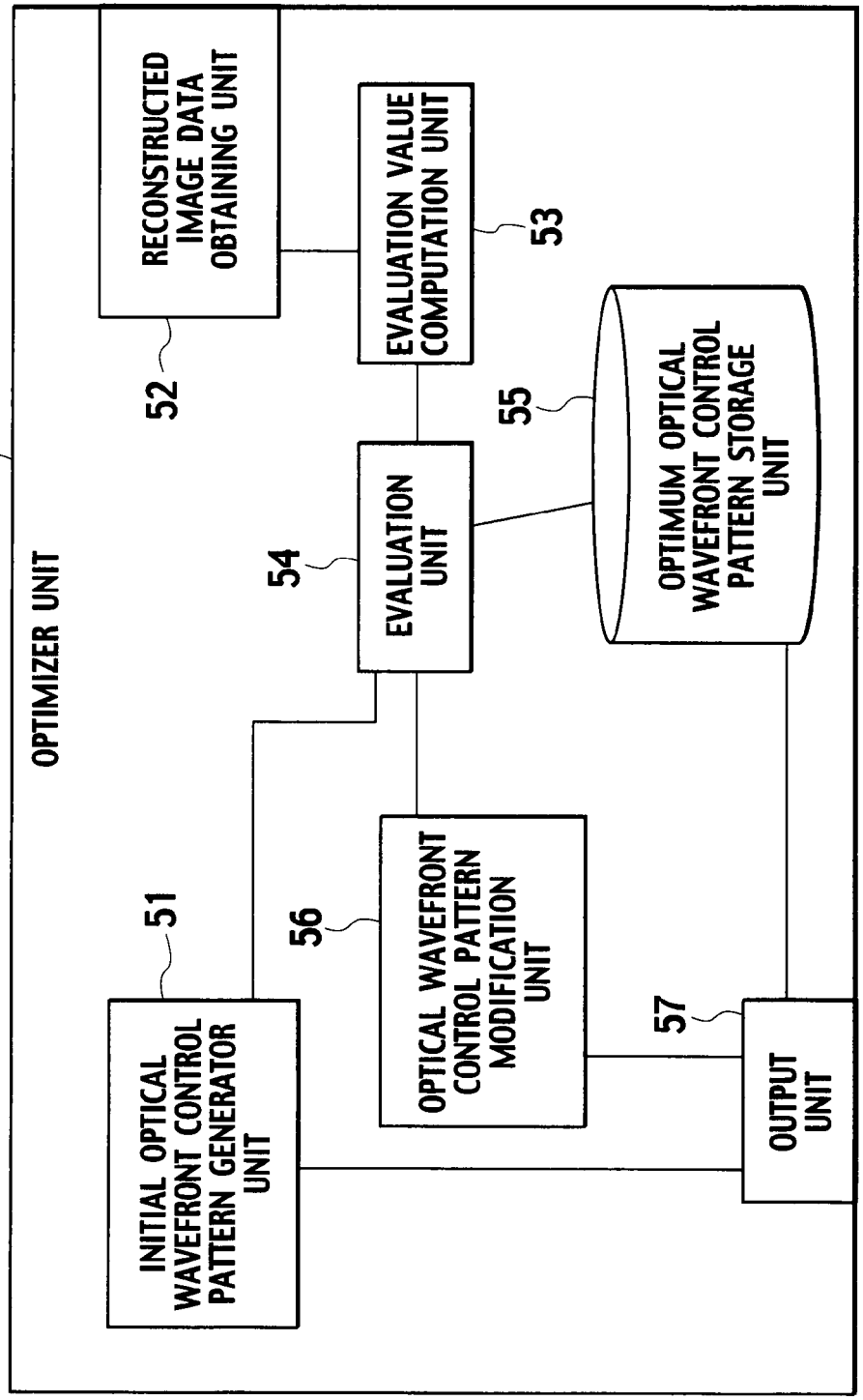
FIG. 3 is a functional block diagram of an optimizer of the optical wavefront control pattern generating apparatus according to the first embodiment of the present invention.

Configuration of Optical Wavefront Control Pattern Generating Apparatus According to a First Embodiment of the Present Invention With reference to FIGS. 1 to 3, descriptions will be provided for a configuration of an optical wavefront control pattern generating apparatus 1 according to a first embodiment of the present invention. By irradiating an optical wavefront controller unit 20, in which the optimum optical wavefront control pattern is recorded, with illuminating light 2, the optical wavefront control pattern generating apparatus 1 according to this embodiment is configured to generate the optimum optical wavefront control pattern, which is to be stored in the optical wavefront controller unit 20, in an image reconstruction system A for displaying a reconstructed image on a reconstructed image display unit 30.

As shown in FIGS. 1 and 2, the optical wavefront control pattern generating apparatus 1 according to this embodiment includes an illuminating light irradiator unit 10, the optical wavefront controller unit 20, the reconstructed image display unit 30, a reconstructed image detector unit 40, and an optimizer unit 50.

The illuminating light irradiator unit 10 is configured to irradiate an optical wavefront control pattern (a hologram), which is displayed on an optical wavefront control device of the optical wavefront controller unit 20, with illuminating light.

The optical wavefront controller unit 20 is configured to record an optical wavefront control pattern transmitted from the optimizer unit 50, and is configured to then display the optical wavefront control pattern on the optical wavefront control device.

The reconstructed image display unit 30 is configured to display the reconstructed image based on reconstruction light 3 propagated from the optical wavefront controller unit 20.

In the image reconstruction system A in the optical wavefront control pattern generating apparatus 1 according to this embodiment, at least any one of an amplitude and a phase of the illuminating light 2 irradiated from the illuminating light irradiator unit 10 is modulated by each pixel of the optical wavefront control pattern displayed on the optical wavefront control device. Thereby, the illuminating light 2 is converted into the reconstruction light 3. The reconstruction light 3 reaches the reconstructed image display unit 30 while changing traveling directions thereof, and thus the reconstructed image is displayed.

The reconstructed image detector unit 40 is configured to detect the reconstructed image displayed on the reconstructed image display unit 30. Specifically, the reconstructed image detector unit 40 includes a sensor which makes it possible to detect the reconstructed image displayed on the reconstructed image display unit 30 with the reconstruction light 3. The reconstruction light 3 is obtained by modulating at least any one of the amplitude and the phase of the illuminating light 2.

For example, in a case of using a CCD camera as the sensor, the reconstructed image detector unit 40 photographs the reconstructed image displayed on the reconstructed image display unit 30 by use of the CCD camera, and transmits, to the optimizer unit 50, reconstructed image data obtained by digitizing the photographed reconstructed image.

The optimizer unit 50 is configured to evaluate the reconstructed image detected by the reconstructed image detector unit 40, and to generate the optimum optical wavefront control pattern by applying a modification process to an optical wavefront control pattern in order for a result of the evaluation to satisfy a predetermined condition.

That is, the optimizer unit 50 is configured to evaluate, on the basis of the reconstructed image data obtained by digitizing the reconstructed image detected by the above-described sensor, the reconstructed image displayed on the reconstructed image display unit 30.

Specifically, the optimizer unit 50 may be configured to generate the optimum optical wavefront control pattern by using a "simulated annealing" method.

That is, the optimizer unit 50 may be configured to generate the optimum optical wavefront control pattern by repeating an application of a modification process (a Move operation) to an optical wavefront control pattern (a solution prior to the Move operation), a computation of an evaluation value E of a reconstructed image corresponding to an optical wavefront control pattern (a solution obtained after the Move operation) to which the modification process has been applied, and a determination, on the basis of the computed evaluation value E, of whether or not the optical wavefront control pattern (the solution obtained after the Move operation), to which the modification process (the Move operation) has been applied, is to be adopted.

The optimizer unit 50 may be configured to determine, on the basis of difference information $\Delta E$ on evaluation values E for the reconstructed image respectively before and after a modification process (a Move operation), whether or not an optical wavefront control pattern (a solution obtained after the Move operation), to which the modification process (the Move operation) has been applied, is to be adopted.

The optimizer unit 50 may be configured to determine, on the basis of an adoption probability P defined by the difference information $\Delta E$ and a repetitive parameter value (a temperature parameter value T), whether or not the optical wavefront control pattern (the solution after the Move operation), to which the modification process (the Move operation) has been applied, is to be adopted.

The optimizer unit 50 may be configured to repeat the modification process (the Move operation), computation of the evaluation value E, and the above-described determination until the evaluation values E of the reconstructed image converge on a predetermined repetitive parameter value (a temperature parameter value T).

The optimizer unit 50 may be configured to vary the above-described repetitive parameter value (the temperature parameter value T) within a predetermined range (a range from a sufficiently high temperature to a sufficiently low temperature). Here, the optimizer unit 50 may be configured to repeat the modification process (the Move operation), the computation of the evaluation value E, and the above-described determination until the evaluation values E of the reconstructed image converge on each of the repetitive parameter values (the temperature parameter values T) in the predetermined range.

Specifically, as shown in FIG. 3, the optimizer unit 50 includes an initial optical wavefront control pattern generator unit 51, a reconstructed image data obtaining unit 52, an evaluation value computation unit 53, an evaluation unit 54, an optimum optical wavefront control pattern storage unit 55, an optical wavefront control pattern modification unit 56, and an output unit 57. Incidentally, specific functions of the respective units will be described later.

Operations of Optical Wavefront Control Pattern Generating Apparatus According to this Embodiment Referring to FIG. 4, operations of the optical wavefront control pattern generating apparatus according to the first embodiment will be described below.

Specifically, descriptions will be provided for operations in which, by using the "simulated annealing" method, the optimizer unit 50 of the optical wavefront control pattern generating apparatus according to this embodiment generates the optimum optical wavefront control pattern (a hologram) to be displayed on the optical wavefront control device of the optical wavefront controller unit 20, in order that a reconstructed image can be displayed on the reconstructed image display unit 30.

As shown in FIG. 4, in step S1001, the initial optical wavefront control pattern generator unit 51 of the optimizer unit 50 generates an initial optical wavefront control pattern (an initial solution of the optical wavefront control pattern) $A_0$.

For example, in a case of using a liquid crystal panel as the optical wavefront control device, and of using a method of displaying the reconstructed image by modulating an amplitude of the illuminating light 2 through a 256 tone grayscale image projected on the liquid crystal panel, the initial optical wavefront control pattern generator unit 51 generates the initial optical wavefront control pattern $A_0$ by assigning random values of 0 to 255 respectively to pixels of the grayscale image on the liquid crystal panel.

In a generation process (step S1001) of the initial optical wavefront control pattern $A_0$, when a number of the pixels is defined as "N", an amount of computation is expressed as "O(N)" because it is necessary to define values respectively for all of the pixels.

In this event, the initial optical wavefront control pattern $A_0$ need not be a random value. The reason is as follows. Nearly 100% of the Move operations, which worsen solutions, are adopted in a high-temperature state (a state where the temperature parameter value T is large) at the time immediately after an experiment starts regardless of the magnitude of a value taken for the initial optical wavefront control pattern $A_0$. Thus, by sufficiently performing computations with the "simulated annealing" method in a sufficiently high-temperature state, the same effect as in a case of generating a random initial solution can be obtained, and a performance of a solution, which can be finally obtained, is not deteriorated.

In step S1002, the output unit 57 of the optimizer 50 outputs, to the optical wavefront controller unit 20, the initial optical wavefront control pattern $A_0$ generated by the initial optical wavefront control pattern generator unit 51.

Moreover, in step S1002, the output unit 57 of the optimizer unit 50 outputs, to the optical wavefront controller unit 20, an initial optical wavefront control pattern $A_1$ modified by the optical wavefront control pattern modification unit 56.

In step S1003, the illuminating light 2 irradiated by the illuminating light irradiator unit 10 is modulated to be reconstruction light 2 by the optical wavefront control pattern ($A_0$ or $A_1$) displayed on the optical wavefront control device of the optical wavefront controller unit 20. Then, the reconstructed image display unit 30 displays the reconstructed image based on the reconstruction light 2.

Thereafter, by use of the CCD camera, the reconstructed image detector unit 40 photographs the reconstructed image displayed on the reconstructed image display unit 30, and digitizes the photographed reconstructed image. After that, the reconstructed image data obtaining unit 52 of the optimizer unit 50 obtains the digitized reconstructed image data from the reconstructed image detector unit 40.

In step S1004a, the evaluation value computation unit 53 of the optimizer unit 50 compares the obtained reconstructed image data with target image data obtained by digitizing a target image previously inputted, and computes the evaluation value E (an evaluation value $E_0$ of the reconstructed image corresponding to the initial optical wavefront control pattern $A_0$) indicating how close the reconstructed image displayed on the reconstructed image display unit 30 is to the target image.

For example, the evaluation value computation unit 53 may be configured to compute the evaluation value E of the reconstructed image by taking an absolute value of a difference between a light intensity of the target image at each of coordinate points and a light intensity of the reconstructed image at each of the coordinate points, and thus by adding up the absolute values respectively for all of the coordinate points. In this case, it is postulated that, in each of the target image data and the reconstructed image data, brightness of light of the target image and of the reconstructed image at the respective coordinate points are digitized, and then recorded, for example, respectively with values of 256 tones.

Note that, as the target image data, it is possible to adopt data on an actual photographed image in which the target image is photographed by using a conventional digital camera or the like. In this case, it is possible to generate an "actual photographed hologram" in which a photographed image can be reconstructed. Thereby, it is made possible to apply the present invention to a hologram camera.

The evaluation unit 54 of the optimizer unit 50 determines, on the basis of the computed evaluation value E of the reconstructed image, whether or not an optical wavefront control pattern corresponding to the above reconstructed image is improved. In a case where it is determined that the optical wavefront control pattern is improved (in a case of "Yes" in step S1004a), the operation proceeds to step S1004b. In a case where it is determined that it is not improved (in a case of "No" in step S1004a), the operation proceeds to step S1006.

For example, the evaluation unit 54 computes difference information $\Delta E = E(A_j) - E(A_{j-1})$ of the evaluation values of the reconstructed images respectively before and after the modification process to the optical wavefront control pattern. In a case where $\Delta E<0$ is true, the evaluation unit 54 evaluates that the optical wavefront control pattern $A_j$ is improved. In a case where $\Delta E<0$ is not true, the evaluation unit 54 evaluates that the optical wavefront control pattern $A_j$ is worsen.

In step S1004b, the evaluation unit 54 determines whether or not the optical wavefront control pattern $A_j$ is improved as compared to the optimum optical wavefront control pattern stored in the optimum optical wavefront control pattern storage unit 55. In a case where it is determined that the optical wavefront control pattern $A_j$ is improved (in a case of "Yes" in step S1004b), the operation proceeds to step S1005. In a case where it is determined that it is not improved (in a case of "No" in step S1004b), the operation proceeds to step S1009.

In step S1005, the evaluation unit 54 stores the above optical wavefront control pattern $A_j$, as the optimum optical wavefront control pattern, in the optimum optical wavefront control pattern storage unit 55.

That is, in step S1005, the evaluation unit 54 determines that the above optical wavefront control pattern $A_j$ is to be adopted as the optimum optical wavefront pattern in a range searched so far.

In addition, the evaluation unit 54 stores the initial optical wavefront control pattern $A_0$, as the optimum optical wavefront pattern, in the optimum optical wavefront control pattern storage unit 55 without making the above-described determination.

On the other hand, in step S1006, the evaluation unit 54 computes an adoption probability P by using equation (1). The adoption probability P indicates a probability of adopting a local modification process (the Move operation) by which the optical wavefront control pattern $A_j$ is computed.

$$P = \exp(-\Delta E/T) \qquad \text{equation (1)}$$

Here, T denotes a temperature parameter value.

In step S1007, on the basis of the computed adoption probability P, the evaluation unit 54 determines whether or not the local modification process, by which the optical wavefront control pattern $A_j$ is computed, is to be adopted.

The evaluation unit 54 performs an operation in step S1009 in a case where it is determined that the above local modification process is to be adopted. The evaluation unit 54 performs an operation in step S1008 in a case where it is determined that the above local modification process is not to be adopted.

In step S1008, an optical wavefront control pattern modification unit 46 converts the optical wavefront control pattern $A_j$ back to the optical wavefront control pattern $A_{j-1}$ which is in a state prior to the above-described local modification process.

In step S1009, the evaluation unit 54 determines whether or not evaluation values $E_j$ of a reconstructed image corresponding to the optical wavefront control pattern $A_j$ converge on the current temperature parameter value T.

Specifically, when computing the optical wavefront control pattern $A_j$ based on the temperature parameter value T, the evaluation unit 54 determines whether or not a sufficient number of times of the local modification processes are previously performed. In addition, this determination is made with the same method as that used for a determination made with the conventional "simulated annealing" method.

The evaluation unit 54 performs an operation in step S1101 in a case where it is determined that the evaluation values $E_j$ of the above reconstructed image converge. The evaluation unit 54 performs an operation in step S1010 in a case where it is determined that the evaluation values $E_j$ of the above reconstructed image do not converge.

In step S1011, the evaluation unit 54 updates the temperature parameter value T.

In step S1012, the evaluation unit 54 determines whether or not evaluation values $E_j$ of a reconstructed image corresponding to the optical wavefront control pattern $A_j$ converge on the temperature parameter value T.

Specifically, the evaluation unit 54 determines whether or not the temperature parameter value T has dropped to a sufficiently low value, i.e., whether or not a sufficient number of times of the local modification processes have been performed. In addition, this determination is made with the same method as that used for a determination made with the conventional "simulated annealing" method.

This operation proceeds to step S1013 in a case where it is determined that a sufficient number of times of the local modification processes have been performed. The operation proceeds to step S1010 in a case where it is determined that a sufficient number of times of the local modification processes have not been performed.

In step S1010, the optical wavefront control pattern modification unit 46 of the optimizer unit 50 applies the local modification process to the above optical wavefront control pattern $A_j$. Here, the local modification process can be defined as a process in which a value for one pixel of the grayscale image on the above-described liquid crystal panel is modified into a random value between 0 and 255.

In step S1013, the output unit 57 of the optimizer unit 50 outputs, as the optimum optical wavefront control pattern, an optical wavefront control pattern stored in the optimum optical wavefront control pattern storage unit 55.

Validation of Operating Speed in Optical Wavefront Control Pattern Generating Apparatus According to this Embodiment An operating speed in the optical wavefront control pattern generating apparatus according to this embodiment will be validated below. Specifically, the operating speed in the optical wavefront control pattern generating apparatus according to this embodiment and an operating speed in a conventional technology will be compared with each other. Here, dimensions of a hologram is set to be 128×128.

Adopted as the conventional technology was an example in which a technique, as shown in Non-patent Document 2, for optimizing a Fourier-converted kinoform by using a "simulated annealing" method on the basis of difference information on solutions respectively before and after a Move operation is implemented in a workstation having a 600 MHz dual CPU; and in which a fast Fourier conversion is used for evaluation of a solution.

As a result of an experiment with the conventional technology as described above, it was possible to evaluate a reconstructed image 40 times per second on average.

On the other hand, the following steps are considered to be bottlenecks in a computation time concerning each time of evaluation on a reconstructed image in the optical wavefront control pattern generating apparatus according to this embodiment:

(A) A step where the optimizer unit 50 records an optical wavefront control pattern in the optical wavefront controller unit 20;

(B) A step where the reconstructed image detector unit (for example, a CCD camera) 40 photographs a reconstructed image displayed on the reconstructed image display unit 30, and converts the photographed image into reconstructed image data:

(C) A step where the optimizer unit 50 computes an evaluation value E based on the reconstructed image data and a target image data; and (D) A step where the optimizer unit 50 determines, on the bases of difference information ΔE on evaluation values of the reconstructed image respectively before and after a Move operation, and of a temperature parameter value T, whether or not the Move operation is to be adopted.

In general, it is considered that steps (A) and (B) which depend on a performance of hardware can each be performed 60 times or more per second.

Meanwhile, it is considered that step (D) can be performed 60 times or more per second when the workstation having a 600 MHz dual CPU is used.

Step (C) is an operation of computing a difference between each pixel of the reconstructed image data and each pixel of the target image data which is corresponds to each pixel of the reconstructed image data, and an operation of thereafter computing a total of all of the differences. For this reason, by making it possible to perform in parallel the computation with dedicated hardware by using an FPGA or the like, it is made possible to process this step at a higher speed than in a case of normally processing the step by a general computer. Accordingly, it is considered that 60 or more times of step (C) can be executed in every second.

As has been described above, use of the optical wavefront control pattern generating apparatus according to this present invention makes it possible to generate an optimum optical wavefront control pattern (a hologram) at a higher speed than in the conventional technology.

Actions and Effects of Optical Wavefront Control Pattern Generating Apparatus According to this Embodiment According to the optical wavefront control pattern generating apparatus according to this embodiment, an optimum wavefront control pattern is generated in the following manner. The reconstructed image detector unit 40, such as a CCD camera, detects a reconstructed image actually displayed on the reconstructed image display unit 30, and the optimizer unit 50 evaluates the detected reconstructed image. Thereby, it is made possible to solve, as much as possible, the problem with noise, which is practically insoluble with software, through processing with hardware, and to obtain a desired reconstructed image faster and more accurately.

Specifically, according to the optical wavefront control pattern generating apparatus according to this embodiment, the optimum optical wavefront control pattern (the hologram) is generated by using a reconstructed image obtained in an actual image reconstruction system (the optical system) A. Thereby, it is made possible to reduce noise which possibly occurs in a case where an optical wavefront control pattern generated under ideal conditions is applied to the actual image reconstruction system A.

According to the optical wavefront control pattern generating apparatus according to this embodiment, it is made possible to replace costs for a "step of computing a reconstructed image from a predetermined hologram", which requires the longest computation time when the optimum optical wavefront control pattern (the hologram) is generated by using the "simulated annealing" method, with costs for elements concerning hardware, as to how fast an operation of using the reconstructed image detector unit 40, such as a CCD camera, can be performed to photograph a reconstructed image generated by actually modulating the illuminating light 2.

Optical Wavefront Control Pattern Generating Apparatus According to a Second Embodiment of the Present Invention With reference to FIGS. 5(a) and 5(b), an optical wavefront control pattern generating apparatus according to a second embodiment of the present invention will be described.

As shown in FIG. 5(a), in the optical wavefront control pattern generating apparatus according to the second embodiment, the optical wavefront controller unit 20 is configured to modulate at least any one of an amplitude and a phase of illuminating light irradiated by the illuminating light irradiator unit 10. The reconstructed image display unit 30 is configured to display a reconstructed image based on reconstruction light 2 obtained by modulating at least any one of the amplitude and the phase of the illuminating light.

Here, the reconstructed image detector unit 40 includes a plurality of sensors (for example, CCD cameras) which make it possible to detect the reconstructed image displayed on the reconstructed image display unit 30. In an example shown in FIG. 5(a), the reconstructed image detector unit 40 includes a left sensor, a central sensor and a right sensor.

Accordingly, as shown in FIG. 5(b), the reconstructed image detector unit 40 makes it possible to obtain a plurality of reconstructed images photographed respectively from various angles.

For this reason, the optimizer unit 50 is configured to evaluate, on the bases of the plurality of reconstructed images detected by the respective plurality of sensors, the reconstructed image displayed on the reconstructed image display unit 30.

For example, the optimizer unit 50 is configured to compute reconstructed image data in the form of a three-dimensional image, on the bases of three reconstructed images respectively photographed by the left sensor, the central sensor and the right sensor, and then to compute an optimum optical wavefront control pattern by comparing the computed reconstructed image data in the form of a three-dimensional image with target image data in the form of a three-dimensional image.

In this embodiment, the optimizer unit 50 may be configured to manage target image data obtained from a direction toward the left side of the target image, that from a direction toward the center thereof, and that from a direction toward the right side thereof, and to compute an optimum optical wavefront control pattern by comparing these target image data respectively with target data obtained by digitizing the three reconstructed images respectively photographed by the left sensor, the central sensor and the right sensor.

INDUSTRIAL APPLICABILITY

As has been described above, the present invention makes it possible to provide an optical wavefront control pattern generating apparatus and an optical wavefront control pattern generating method with which the problem with noise, which is practically insoluble with software, can be solved through processing with hardware; and with which a desired reconstructed image can be obtained faster and more accurately.

The invention claimed is:

1. An optical wavefront control pattern generating apparatus which generates an optimum optical wavefront control pattern which is to be stored in an optical wavefront controller unit, in an image reconstruction system displaying a reconstructed image on a reconstructed image display unit, by irradiating the optical wavefront controller unit, in which an optical wavefront control pattern is recorded, with illuminating light, the apparatus comprising:

a reconstructed image detector unit configured to detect a reconstructed image displayed on the reconstructed image display unit; and an optimizer unit configured to evaluate the reconstructed image detected by the reconstructed image detector unit, and to generate the optimum optical wavefront control pattern by applying a modification process to the optical wavefront control pattern in order for a result of the evaluation to satisfy a predetermined condition, the optimizer unit being configured to generate the optimum optical wavefront control pattern by repeating an application of a modification process to the optical wavefront control pattern, a computation of an evaluation value of a reconstructed image corresponding to the optical wavefront control pattern to which the modification process has been applied, and a determination, on the basis of the evaluation value, of whether or not the optical wavefront control pattern, to which the modification process has been applied, is to be adopted on the basis of difference information and of an adoption probability determined by a repetitive parameter value.

2. The optical wavefront control pattern generating apparatus according to claim 1, wherein:

on the basis of the difference information on evaluation values of the reconstructed image respectively before and after the modification process, the optimizer unit is configured to determine whether or not the optical wavefront control pattern, to which the modification process has been applied, is to be adopted.

3. The optical wavefront control pattern generating apparatus according to claim 2, wherein:

the optimizer unit is configured to repeat the application of the modification process, the computation of the evaluation value, and the determination, until the evaluation values of the reconstructed image converge on a predetermined repetitive parameter value.

4. The optical wavefront control pattern generating apparatus according to claim 3, wherein:

the optimizer unit is configured to vary the predetermined repetitive parameter value within a predetermined range.

5. The optical wavefront control pattern generating apparatus according to claim 1, wherein:
the optical wavefront controller unit comprises an optical wavefront control device capable of modulating at least any one of an amplitude and a phase of the illuminating light by use of the recorded optical wavefront control pattern.

6. The optical wavefront control pattern generating apparatus according to claim 1, wherein:
the reconstructed image detector unit comprises a sensor capable of detecting the reconstructed image displayed on the reconstructed image display unit by use of reconstruction light obtained by modulating at least any one of an amplitude and a phase of the illuminating light.

7. The optical wavefront control pattern generating apparatus according to claim 6, wherein:
the optimizer unit is configured to evaluate the reconstructed image on the basis of the reconstructed image detected by the sensor.

8. The optical wavefront control pattern generating apparatus according to claim 1, wherein:
the reconstructed image detector unit comprises a plurality of sensors each capable of detecting the reconstructed image displayed on the reconstructed image display unit by use of reconstruction light obtained by modulating at least any one of an amplitude and a phase of the illuminating light, and
the optimizer unit is configured to evaluate the reconstructed image on the bases of a plurality of reconstructed images respectively detected by the plurality of sensors.

9. An optical wavefront control pattern generating method for generating an optimum optical wavefront control pattern which is to be stored in an optical wavefront controller unit, in an image reconstruction system displaying a reconstructed image on a reconstructed image display unit, by irradiating the optical wavefront controller unit, in which an optical wavefront control pattern is recorded, with illuminating light, the method comprising:
detecting a reconstructed image displayed on the reconstructed image display unit;
evaluating the reconstructed image detected by the detecting; and
generating the optimum optical wavefront control pattern by applying a modification process to the optical wavefront control pattern in order for a result of the evaluation to satisfy a predetermined condition, the generating the optimum optical wavefront control pattern including repeating an application of a modification process to the optical wavefront control pattern, a computation of an evaluation value of a reconstructed image corresponding to the optical wavefront control pattern to which the modification process has been applied, and a determination, on the basis of the evaluation value, of whether or not the optical wavefront control pattern, to which the modification process has been applied, is to be adopted on the basis of difference information and of an adoption probability determined by a repetitive parameter value.

10. The optical wavefront control pattern generating apparatus according to claim 1, further comprising:
a dedicated difference generating hardware unit configured to calculate differences between each pixel of the reconstructed image and each pixel of a target image, and to total all of the differences.

11. The optical wavefront control pattern generating apparatus according to claim 10, wherein the dedicated difference generating hardware unit is an FPGA.

12. The optical wavefront control pattern generating apparatus according to claim 1, wherein the optimizer unit is configured to evaluate whether or not to adopt each modification, the optimizer unit is configured to adopt a modification with a worse result of the evaluation than a result of the evaluation for a current state based on a nonzero probability, the optimizer unit is configured to determine an adoption probability, the adoption probability being a probability that a particular modification is adopted, the adoption probability being computed according to the following equation:

$$P = \exp(-\Delta E/T),$$

where P is the adoption probability for a particular modification, $\Delta E$ is a difference between a result of the evaluation for the particular modification and the result of the evaluation for the current state, and T is a temperature parameter value which is reduced after each modification is evaluated.

* * * * *